March 17, 1970
P. E. TITUS
3,501,282
PREPARATION OF PELLETIZED POTASSIUM
CHLORIDE-UREA-SULFUR FERTILIZER
Filed Sept. 9, 1966
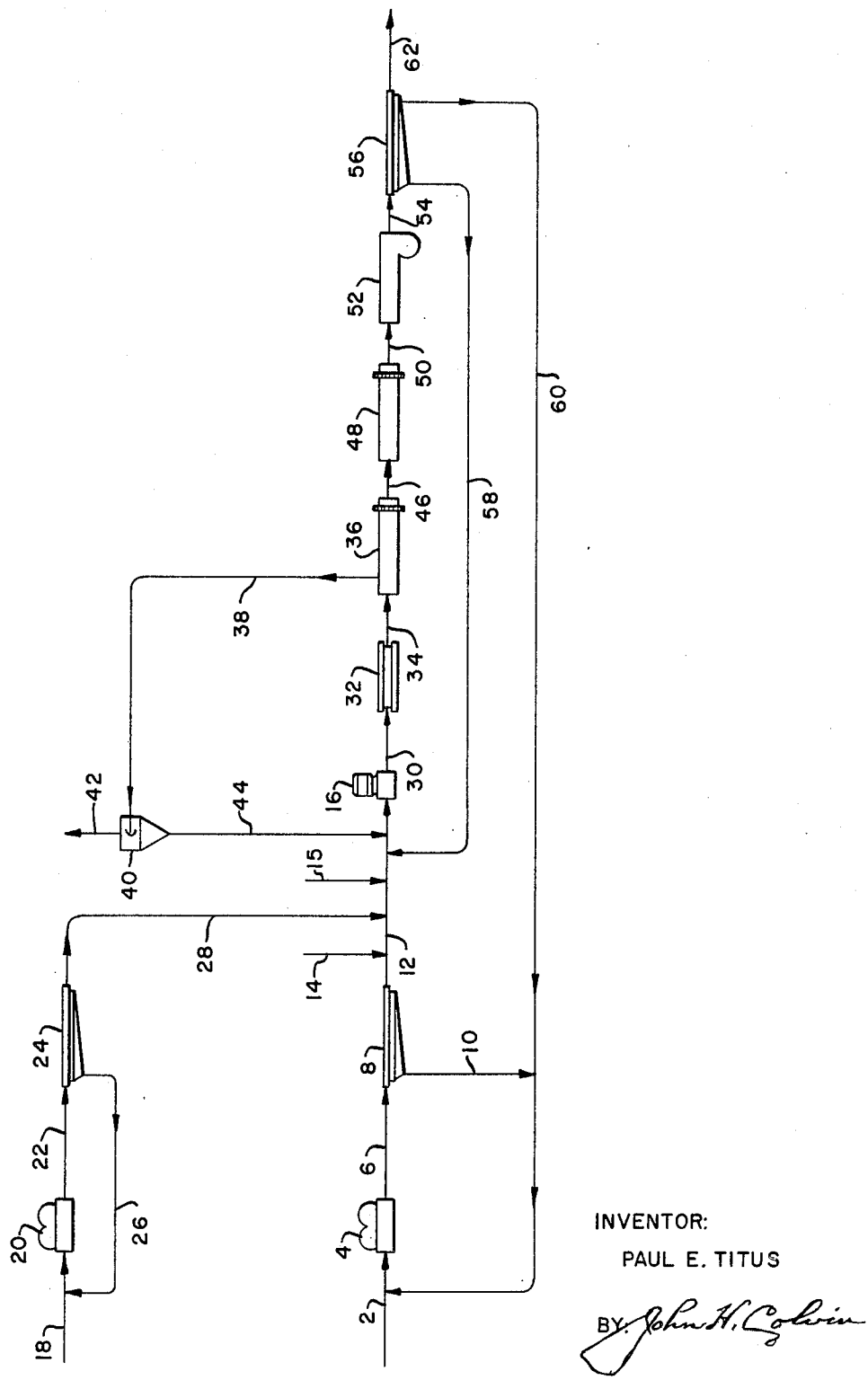
INVENTOR:
PAUL E. TITUS
BY John H. Colvin
HIS ATTORNEY

United States Patent Office 3,501,282
Patented Mar. 17, 1970

3,501,282
PREPARATION OF PELLETIZED POTASSIUM
CHLORIDE-UREA-SULFUR FERTILIZER
Paul E. Titus, Houston, Tex., assignor to Shell Oil Company, New York, N.Y., a corporation of Delaware
Filed Sept. 9, 1966, Ser. No. 578,249
Int. Cl. C05d 1/02; C05g 1/00
U.S. Cl. 71—28                                2 Claims

ABSTRACT OF THE DISCLOSURE

Fertilizer pellets are produced from a mixture of finely divided potassium chloride, urea and sulfur by agglomerating the mixture in the presence of an appropriate amount of water, drying at a temperature below the melting point of the urea and sulfur. The dried pellets are hardened by heating to the melting temperature of the sulfur and/or urea, then cooled to provide the pellets with a hard glaze of fused sulfur and/or urea. In preparing the pellets, the materials, such as the potassium chloride or sylvite, are pulverized to a particle size of preferably 10 microns to 1000 microns, and to a fineness such that at least 20% by weight but no more than 50% by weight passes through a 325 mesh U.S. Standard sieve. To produce potassium chloride pellets glazed with a mixture of urea and sulfur, the dried pellets formed as above indicated, are heated for a short residence time at a temperature sufficient to melt the urea, which will likewise melt the sulfur, the melting temperature of urea being about 171° F., and on cooling, the pellets are provided with a urea-sulfur glaze. The amount of the components utilized in preparing these pellets is such that the finished pellets contain at least 35% by weight of potassium chloride and 5%–40% by weight of the sulfur-urea mixture, the sulfur to urea weight ratio being between about 1:2 to 2:1.

---

This invention relates to an improved method of preparing pelletized potassium chloride-containing fertilizers.

THE PRIOR ART

Crystalline materials, such as salts, are frequently provided in small particulate form. Some are compressed into pellets for various uses. Sylvite, a naturally occurring potassium chloride, can be transported in ground form long distances through a pipe line in a slurry in crude or refined oil. However, this requires that the particles being carried are small enough while in high concentration to prevent rapid settling in the carrier oil, or that a sufficient amount of small particles is present together with larger particles to prevent rapid settling.

The very nature of the solid that yields a good slurry may require such small particle sizes that the further use of the recovered solids may be severely limited unless further processing is available to bring them up into a particle size range in which they can be utilized. In the case of sylvite transported in an oil slurry, approximately one-half of the solids are of a particle size too small to be used directly for commercial fertilizer applications. Therefore, reconstitution of the recovered sylvite into larger particles is necessary.

In addition, commercial solid fertilizers are often made into small spherical pellets to improve hardness and facilitate bulk blending of various fertilizer ingredients to meet customer demands. Pelletizing may be accomplished by agglomeration and drying of fines in rotary equipment (e.g., pan granulators, rotary kilns), or by the dropping of a liquid as drops into a quench (prilling) medium. Some materials are not readily "pelletizible," such as potassium chloride, due to the uniform symmetrical shape and usual dense structure of their crystals. When pelletizing is not practical, the fertilizers are distributed as relatively large crystals. The shape of the particles of these latter fertilizers is detrimental, because their angularity not only hinders good bulk blending and representative distribution, but also makes it difficult to incorporate the materials into a particle containing more than one nutrient, i.e., a balanced fertilizer.

Hardness of agglomerated particles is a very desirable characteristic of fertilizers. Since considerable mechanical handling is involved not only in transportation, but also in subsequent mixing (e.g., in bulk blending) and distribution, inadequate hardness results in fracture and attrition of the pellets, and formation of undesirable fines and dust.

Other undesirable characteristics of fertilizers are the relatively high hygroscopicity and water solubility associated with many inorganic salts, such as sylvite. As the moisture content of a hydroscopic fertilizer increases, difficulty is experienced in the handling of the material as seen in the packing and bridging of the bulk during transportation, storage and distribution. High water solubility results in too rapid loss of applied fertilizers, necessitating repetitive applications. In some balanced fertilizers, one component will leach out at a greater rate than the others, thus upsetting the balance of nutrients.

THE OBJECTS

It is an object of the present invention to provide an improved process for the agglomeration of finely divided potassium chloride particles. Another object is to provide an improved process for the production of a balanced fertilizer, containing KCl as its primary ingredient, which is in the form of hard pellets having relatively low hygroscopicity and water solubility.

These objects will be better understood, and others will be apparent from the following description of the invention, which will be made in part with reference to the accompanying drawing.

THE DRAWING

In the drawing, the sole figure is a flow diagram illustrating a preferred embodiment of a process for the agglomeration of finely divided particles of sylvite with other nutrients into hard pellets to form a balanced fertilizer.

THE INVENTION

It has now been found that potassium chloride particles can be agglomerated, alone or with other fertilizer components or nurtients, into hard pellets with relatively low hygroscopicity and water solubility by an improved process comprising adding finely divided particles of sulfur and/or urea, both soil nutrients with relatively low melting points, to a finely divided potassium chloride-containing mix, wetting, granulating and drying by known and accepted procedures, then glazing the dried pellets by superficially melting the sulfur and/or urea in a zone of high temperature and for a short residence time. The subsequently cooled pellets with a hard glaze of fused sulfur and/or urea not only have a hard outer shell, but also those component particles previously found to be difficult to agglomerate are more firmly bonded together within the pellet.

The potassium chloride particles may exist in the form of small, dust-like particles, up to particles having sizes of grains of sand. They are initially dry. The dry granules are sieved to yield a grading of preferably 10 mcirons to 1000 microns; i.e., the granules should be pulverized to a fineness, such that at least 20% by weight, but not more than 50% by weight, pass through a 325 mesh sieve (U.S. Bureau of Standards, Standard Screen Series, 1919), and that essentially 100% by weight pass through a 16-mesh sieve.

Since urea is soluble in water, it alone will not improve the pellet with respect to hygroscopicity and water solubility to the extent found with sulfur alone. In the case of sulfur, the pellet so formed has low hygroscopicity and rate of solubility. These latter properties can be regulated by the amount of total sulfur present, the sulfur/urea ratio, and/or the degree of glazing accomplished in the hot zone.

The urea and sulfur used in the process may be obtained from any convenient source. Since both urea and sulfur are soil nutrients, the amounts added are governed not only by the condition of the pellets, but also by market requirements. For example, it has been found that a pellet containing about 25–35% by weight sulfur and with about 50% by volume of a 1:1 sulfur:urea mix, the remainder of the pellet being ground potassium chloride with or without diammonium phosphate, has the characteristics of a good fertilizer. The pellets so formed are considerably harder and dissolve much slower in water than similar untreated pellets.

The urea and sulfur added to the pulverized potassium chloride grind are initially dry. If desired, other soil nutrients may be added at the same time the urea and sulfur are admixed with the grind. These additives or supplements may be selected from a variety of other salts, such as diammonium phosphate, ammonium sulfate, ammonium nitrate, potassium phosphate, and ferrous sulfate (copperas). The amounts in which these supplements are used can be varied within wide limits, depending upon the desired chemical characteristics of the resulting fertilizer pellets. Amounts of supplements from about 0.05% to about 35%, preferably less than about 25%, by weight (basis solid pellet) can be used satisfactorily. The potassium chloride should be sufficient to constitute at least about 35%, preferably from about 50% to about 80% by weight of the finished pellets.

Care must be taken in the wetting step of the process not to introduce into the mix too much water which would tend to dissolve an excessively large part of the material being reconstituted. The wetting solution itself may be water, or any one of a variety of salt brines, for example, a saturated potassium chloride brine. It has been found that, in general, the water in the resulting mixture should be insufficient to dissolve more than one-fourth, preferably no more than one-tenth, of the water-soluble particulate material, i.e., the water content of the wet mix should preferably not exceed about 20% by weight of the mix.

As already stated, granulation or pelletization and subsequent drying of the pellets may be accomplished in any of the several known methods. Pan granulators and rotary kilns have proven to be satisfactory for the agglomeration and drying of the fines.

Both urea and sulfur have relatively low melting points, urea melting at about 271° F. and sulfur at about 248° F. The drying, therefore, must be carried out at temperatures below the melting point of sulfur when it is present, or below the melting point of urea if sulfur is not present.

The dried pellets are subjected to a final step, the glazing stage, in a zone of high temperature and short residence time. The pellets after this treatment have a hard glaze of fused sulfur and/or urea, which not only gives a hard outer shell, but also binds together all of the components in the pellets. The glazing is generally carried out at a pellet surface temperature of between about 250° F. and 350° F., preferably between about 275° F. and 300° F., in a rotary oven or any other conventional apparatus which allows the pellets to reach the desired temperature in the shortest possible residence time. Residence times are also important, with times between about 30 seconds and 180 seconds, preferably between about 60 seconds and 90 seconds, being suitable.

As noted earlier, the amount of urea and/or sulfur that is to be added depends, inter alia, upon the market requirement for the particular fertilizer being manufactured. In general, the pellets should contain from about 5% to about 40% by weight sulfur, preferably between about 10% and about 20%, and about 5% to about 40% by weight urea, preferably between about 10% and 20%, with the total weight of sulfur and urea being no more than about 60% of the pellet composition. It must be noted, however, that the rate of solubility of the glazed product in water may be controlled by varying either the amount of sulfur or urea, or the degree of glazing.

Preferably, both sulfur and urea, each in a finely divided state, are added to the sylvite, in a weight ratio of sulfur:urea of between about 1:5 and 5:1, preferably between about 1:2 and 2:1.

Referring to the drawing, the invention is illustrated as applied to the pelletizing and hardening of sulfur and urea stabilized pellets of sylvite. Sylvite is supplied at 2, and pulverized in grinder 4. The grind then passes through line 6 into a classifier 8, where the larger particles are segregated from the smaller ones, and are recycled via lines 10 and 60 to the grinder for further pulverization. The finely divided particulate mass is then passed via line 12 into mixer 16. Additional nutrients may be added through line 14, to be physically combined with sylvite in line 12 and mixer 16.

Sulfur and/or urea are supplied at 18, and are passed into grinder 20, where they are reduced to a particle size compatible with that of the sylvite. They are subsequently fed via line 22 into classifier 24, where the over-sized particles are separated from the smaller ones, and are recycled to the grinder via line 26. The properly sized particles of urea and/or sulfur are passed via line 28 into line 12, where they are fed in admixture with the sylvite to mixer 16.

Water or brine is added through line 15 to wet the particulate mass before it enters mixer 16. If desired, however, the wetting agent may be added directly into the mixer, in lieu of the addition to line 12.

The wetted mixture proceeds through line 30 to a pan granulator 32, which pelletizes the moist mass. The wet pellets are thereafter passed via line 34 into a drier 36, which may be of any conventional design, such as a vacuum drier, but is preferably a rotary gas drier. Any fines which have been passed into the drier from the pan granulator 32 are caught up in the gas flow and swept into cyclone 40 via line 38, where the gaseous and solid phases are separated, the gas exiting from the cyclone via line 42 and the fines being recycled and reintroduced into the moist mixture in line 12 via line 44.

The dried pellets exit from the drier via line 46, and are fed into a glazing oven 48, preferably a rotary oven. After a short residence time in the oven 48, the glazed pellets are passed into cooler 52 via line 50, where they are cooled, and subsequently via line 54, to classifier 56. In classifier 56, the glazed pellets are segregated, undersized pellets being rejected and fed back into line 12 via line 58 for reforming, oversized pellets being fed back to point 2 via line 60 for reintroduction into grinder 4. The finished pellets of acceptable size discharged from classifier 56 via line 62 consist of sylvite, together with other nutrients as desired, and have a hard outer coating of urea and/or sulfur.

EXAMPLES

The following examples are given for illustrative purposes only, and should not be considered as limiting the invention to the particular embodiments therein disclosed. All percentages are percent by weight.

Example I

Sylvite (560 g.) with the particle size range shown in the table below and with 6.68 g. crude petroleum oil was blended with ground sulfur (240 g.) (200 mesh) and diammonium phosphate (0.6 g.) such that the final blend contained 69.4% sylvite, 30% sulfur, 0.1% diammonium phosphate and 0.5% crude oil (dry basis). The oil represents that which is entrained after separation of the sylvite from a sylvite-oil mixture used in the crude oil transport of sylvite. Potassium chloride brine (259 g.) was added until the mixture was plastic enough to pelletize on a rotating sieve (about 18% water). The pellets were dried on a steam table at about 240° F. for about 17 hours. The dried pellets were then glazed by an open flame (surface temperature was about 280–300° F.) for about one minute.

| U.S. Sieve No. | Sieve opening, microns | KCl particles, percent |
|---|---|---|
| Retained on— | | |
| 30 | 590 | 18.9 |
| 50 | 297 | 23.3 |
| 100 | 149 | 11.3 |
| 200 | 74 | 10.8 |
| 325 | 44 | 12.1 |
| Passed 325 | | 23.6 |

After cooling, the pellets were found to be significantly harder, less hygroscopic, and slower in dissolving than similar pellets made without sulfur. These pellets had a bulk density of 0.76 gram/milliliter.

Example II

The procedure outlined in Example I was followed, except that the blend was altered to 49.4% sylvite, 25% sulfur, 25% urea, 0.1% diammonium, and 0.5% oil.

After pelletizing, drying and glazing, the pellets were found to be harder then pellets made with sylvite alone. The rate of solution in water was slower than pellets containing only sylvite, though faster than the pellets made in Example I. The pellets had a bulk density of 0.69 gram/milliliter.

I claim as my invention:

1. A process for producing agglomerated hard pellets of sulfur-urea glazed potassium chloride fertilizer of low hygroscopicity and water solubility comprising:
   (a) pulverizing potassium chloride to a particle size range between about 10μ and about 1000μ, the fineness being such that at least 20% and not exceeding 50% will pass through a 325 mesh U.S. Standard sieve;
   (b) admixing said finely divided potassium chloride particles with a mixture containing sulfur and urea in the weight ratio between 1:2 and 2:1, the amount of potassium chloride being at least 35% by weight on the basis of the finished pellets, with the sulfur-urea mixture being between about 5% and 40% by weight on the basis of the finished pellets and sufficient to glaze the pellets;
   (c) uniformly water wetting the admixture of (b) with water in an amount sufficient to effect granulation thereof and not exceeding 20% by weight of the admixture;
   (d) agglomerating the wet mix of (c) into pellets;
   (e) drying said pellets at a temperature below the melting points of sulfur and urea;
   (f) heating said pellets at between 275° F. and 300° F. for from 30 to 180 seconds; and,
   (g) cooling the heated pellets of (f) to form a hard sulfur-urea glaze thereon.

2. A process in accordance with claim 1 wherein the particle size distribution of said finely divided potassium chloride particles is such that at least 20% of said particles pass through a 325 mesh sieve, and to which has been added a minor amount of diammonium phosphate.

References Cited

UNITED STATES PATENTS

| 2,097,446 | 11/1937 | Claiborne et al. | 71—40 XR |
| 2,107,701 | 2/1938 | Haase et al. | 71—61 |
| 3,177,062 | 4/1965 | Hignett et al. | |
| 3,206,297 | 9/1965 | O'Connor | 71—61 XR |

S. LEON BASHORE, Primary Examiner

B. H. LEVENSON, Assistant Examiner

U.S. Cl. X.R.

71—61, 64